(12) United States Patent
Morris

(10) Patent No.: US 10,977,387 B2
(45) Date of Patent: Apr. 13, 2021

(54) INTERNET-BASED SEARCH MECHANISM

(71) Applicant: BUBBLR LIMITED, London (GB)

(72) Inventor: Stephen Morris, Kelty (GB)

(73) Assignee: BUBBLR LIMITED, London (GB)

( * ) Notice: Subject to any disclaimer, the term of this patent is extended or adjusted under 35 U.S.C. 154(b) by 91 days.

(21) Appl. No.: 16/244,434

(22) Filed: Jan. 10, 2019

(65) Prior Publication Data

US 2019/0147189 A1 May 16, 2019

Related U.S. Application Data

(63) Continuation of application No. 15/303,038, filed as application No. PCT/GB2015/051130 on Apr. 14, 2015, now abandoned.

(30) Foreign Application Priority Data

Apr. 14, 2014 (GB) ...................................... 1406676

(51) Int. Cl.
*G06F 21/62* (2013.01)
*G06F 16/951* (2019.01)
*H04L 29/06* (2006.01)

(52) U.S. Cl.
CPC ........ *G06F 21/6254* (2013.01); *G06F 16/951* (2019.01); *H04L 63/0407* (2013.01); *H04L 63/18* (2013.01)

(58) Field of Classification Search
CPC ............... G06F 21/6254; G06F 16/951; H04L 63/0407; H04L 63/18
See application file for complete search history.

(56) References Cited

U.S. PATENT DOCUMENTS

| 7,788,262 B1 * | 8/2010 | Shirwadkar | G06F 16/36 707/737 |
| 8,473,470 B1 * | 6/2013 | Cook, Jr. | G06F 16/954 707/705 |

(Continued)

FOREIGN PATENT DOCUMENTS

WO WO-0125947 A1 4/2001

OTHER PUBLICATIONS

Patsakis, Constantinos, et al., "Privacy as a Product: A Case Study in the m-Health Sector", IISA 2013, IEEE, Jul. 10, 2013, pp. 1-6.

(Continued)

*Primary Examiner* — Ali S Abyaneh
*Assistant Examiner* — Shu Chun Gao
(74) *Attorney, Agent, or Firm* — Lando & Anastasi, LLP

(57) ABSTRACT

A system for providing an internet-based search mechanism to enable an anonymous user to search for a resource provider. The system comprises a user device adapted to host an internet-based portal such that a user can submit an anonymous request for information relating directly to a resource. A secure server adapted to host a database containing resource provider information, to communicate with the user device via a communications network and to alert at least a first resource provider is also provided. The secure server is also adapted to initiate an anonymous communication channel between at least the first resource provider and the user via the internet-based portal and the communications network. A method for carrying out such a search is also disclosed.

15 Claims, 3 Drawing Sheets

(56) References Cited

U.S. PATENT DOCUMENTS

Figure 1:
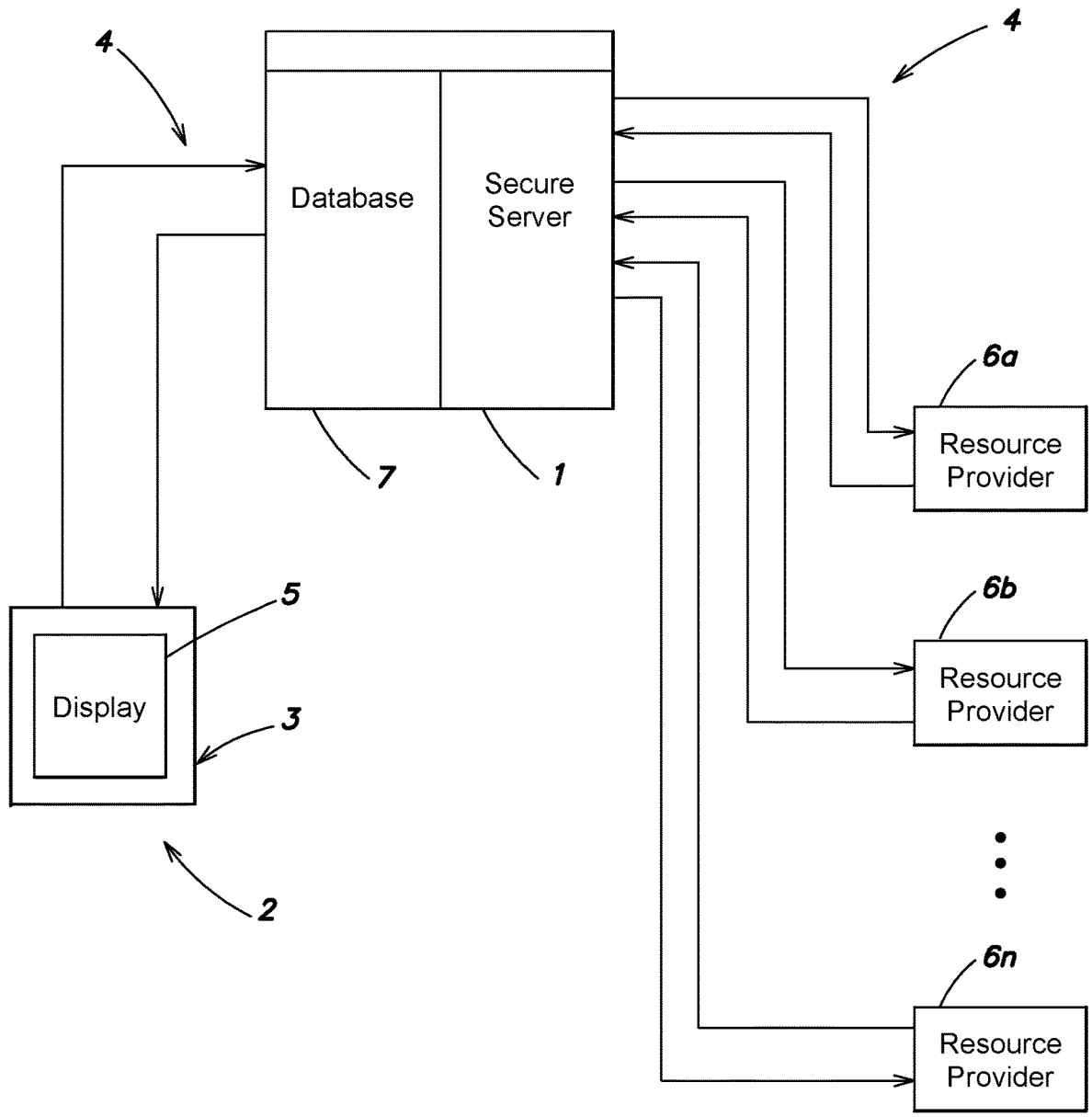

| | | | |
|---|---|---|---|
| 9,542,391 B1* | 1/2017 | Eisner | G06F 16/283 |
| 10,825,567 B1* | 11/2020 | Wala | G16H 40/63 |
| 2007/0130312 A1* | 6/2007 | Shin | G06F 9/546 |
| | | | 709/223 |
| 2008/0021884 A1* | 1/2008 | Jones | G06F 16/951 |
| 2008/0033930 A1 | 2/2008 | Warren | |
| 2008/0104031 A1* | 5/2008 | Grasso | G06Q 30/0256 |
| 2011/0066607 A1* | 3/2011 | Wong | G06F 16/9038 |
| | | | 707/706 |
| 2011/0110568 A1* | 5/2011 | Vesper | G06Q 10/10 |
| | | | 382/128 |
| 2012/0041941 A1* | 2/2012 | King | G06F 16/58 |
| | | | 707/711 |
| 2013/0018913 A1 | 1/2013 | Jones et al. | |
| 2013/0124613 A1 | 5/2013 | Plache et al. | |

OTHER PUBLICATIONS

Australian Examination Report No. 3 from corresponding Australian Application No. 2015248619 dated Aug. 6, 2020.

* cited by examiner

INTERNET-BASED SEARCH MECHANISM

The present invention relates to a method of and system for providing an internet-based search mechanism to enable an anonymous user to search for a resource provider, in particular, a mechanism utilising an anonymous request for information, relating to a resource required by a user, submitted to a database of resource provider information via an internet-based portal.

The use of internet search engines is widespread, with many people accessing such programmes via computers, laptops, tablets, smartphones and other devices on an almost daily basis. Traditional search engines work using a synchronous methodology, in that a search term is entered into a dialogue box and a plurality of results is returned, with each result being in the form of a hyperlink to a webpage. The ordering of the results is determined by an algorithm used by the search engine, which typically combines the number of times a search term appears within the content of a webpage, and whether or not the provider of the webpage has subscribed to a pay-per-click advertising regime. Whether a word or phrase appears amongst the content of a webpage is not indicative as to whether that webpage is actually relevant to the search carried out. Results are not displayed in a format that indicates relevance or whether the webpage is indeed appropriate to the search, but entirely based on the inputs to the algorithm used. This can lead to anomalous results. Since historically the internet was designed for sharing information, searching for specific resources such as goods and/or services can be time-consuming and frustrating for the user, since content alone is not sufficient to determine whether the search has been successful.

One example of this is where a specific resource is required, for example, a user wishes to search for a direct flight from Liverpool (UK) to Southampton (UK). If a user enters the terms "direct flights Liverpool Southampton" into an internet search engine, many thousands of results are returned. This may seem ideal initially, indicating that there is a wide variety of choice of resource providers (parties able to provide the user with the requested resource) and a number of viable flight options. However, there, as of April 2014, no direct flights between Liverpool (UK) and Southampton (UK). Despite a high number of results from the input search, these are in effect anomalous. Consequently synchronous search engines, whilst being ideally suited to searching for information, are less efficient when searching for specific resources, such as goods and/or services.

A second issue with using internet-based search engines is that once a search has been carried out the results may be tied to the identity of the user in some way and used to direct further advertising or search results. For example, if a user inputs a search request into a search engine both the search and the user's IP (internet protocol) address may be stored by the search engine. This results in either previous searches being displayed in a search history function and/or targeted advertising being displayed next time the user accesses the search engine. Aside from using a pay-per-click approach, such as with the ordering of search results, parties may also pay for advertising on a cost per view approach, where advertising is charged at a rate based upon the number of views through the search engine. This may be seen as being an issue affecting the privacy of the user, the perceived security of the search process, since in effect their identity is known and used in providing yet further information regarding resources that may be anomalous.

There is, therefore, a need to optimise the performance of search engines, taking into account issues with user privacy and security, and accuracy of returned search results relating to resources such as specific goods and/or services.

The present invention aims to address these problems by providing a method of providing an internet-based search mechanism to enable an anonymous user to search for a resource provider, comprising the steps of: submitting an anonymous request for information relating to a resource required by a user to a database of resource provider information via an internet-based portal; interrogating the database to retrieve information relating to first resource provider information associated with the resource and alerting the first resource provider that the anonymous request for information has been submitted; initiating an anonymous Internet-based communication channel between the user and the first resource provider via the internet-based portal by the first resource provider submitting a first Universal Resource Locator (URL) to the user in response to the anonymous request for information; and if the first Universal Resource Locator does not contain information relating directly to the resource requested by the user, closing the anonymous internet-based communication channel and preventing the first resource provider from communicating further with the user via the internet-based portal, and alerting a second resource provider that the anonymous request for information has been submitted; else if the first Universal Resource Locator does contain information relating directly to the resource requested by the user, deleting the anonymous request for information from the internet-based portal.

The advantage of such a search mechanism is that it is secure compared with existing systems, due to the anonymity of the user, and the accuracy of returned search results relating to resources such as specific goods and/or services is greatly improved. It offers benefits to the user in terms of increased sensitivity to information requests; reduced time spent searching for specific goods and services, and a reassurance that the users' identity remains unknown by resource providers, thus overcoming issues and concerns associated with the use of personal data in an internet environment.

Preferably the database is a component of an asynchronous search engine.

Preferably, the user closes the anonymous communication channel.

Preferably when the anonymous internet-based communication channel is initiated, the method further comprises displaying an option for the user to accept or reject the Universal Resource Locator.

Preferably, when the user rejects the Universal Resource Locator, the anonymous communication channel is closed to the resource provider.

Preferably, the method further comprises the steps of: if the first Universal Resource Locator does not contain information relating directly to the resource requested by the user, assigning a negative indicator, and if the first Universal Resource Locator does contain information relating directly to the resource requested by the user, assigning a positive indicator.

Alternatively, the method further comprises the steps of: if the user rejects the Universal Resource Locator, assigning a negative indicator, and if user accepts the Universal Resource Locator, assigning a positive indicator.

Preferably the resource provider information is stored in the database ranked in order of the number of positive and negative indicators assigned to each resource provider.

Preferably the database only contains resource provider information for authorised resource providers.

Preferably the internet-based portal comprises a software application and user interface. In this situation, on receipt of the Universal Resource Locator the software application displays resource provider information in the format of an Internet browser, and wherein the internet browser has a content display region for content linked via the Universal Resource Locator, an accept button and a reject button.

Preferably, content is displayed to the user one Universal Resource Locator at a time.

Preferably if the first Universal Resource Locator does contain information relating directly to the resource requested by the user, the method further comprises the steps of: storing the anonymous information request at the database; and polling resource providers until a resource provider able to provide the resource information is identified.

Preferably the resource comprises goods and/or services.

Preferably the information in the database is ordered by the number of times a resource provider has provided a Universal Resource Locator containing the requested resource, such that the first and second resource providers are ranked, wherein the first resource provider is ranked higher than the second resource provider.

In a second aspect, the present invention also provides a system for providing an internet-based search mechanism to enable an anonymous user to search for a resource provider, comprising: a user device adapted to host an internet-based portal such that a user can submit an anonymous request for information relating directly to a resource; and a secure server adapted to host a database containing resource provider information, to communicate with the user device via a communications network and to alert at least a first resource provider; wherein the secure server is also adapted to initiate an anonymous communication channel between at least the first resource provider and the user via the internet-based portal and the communications network.

Figure 2:
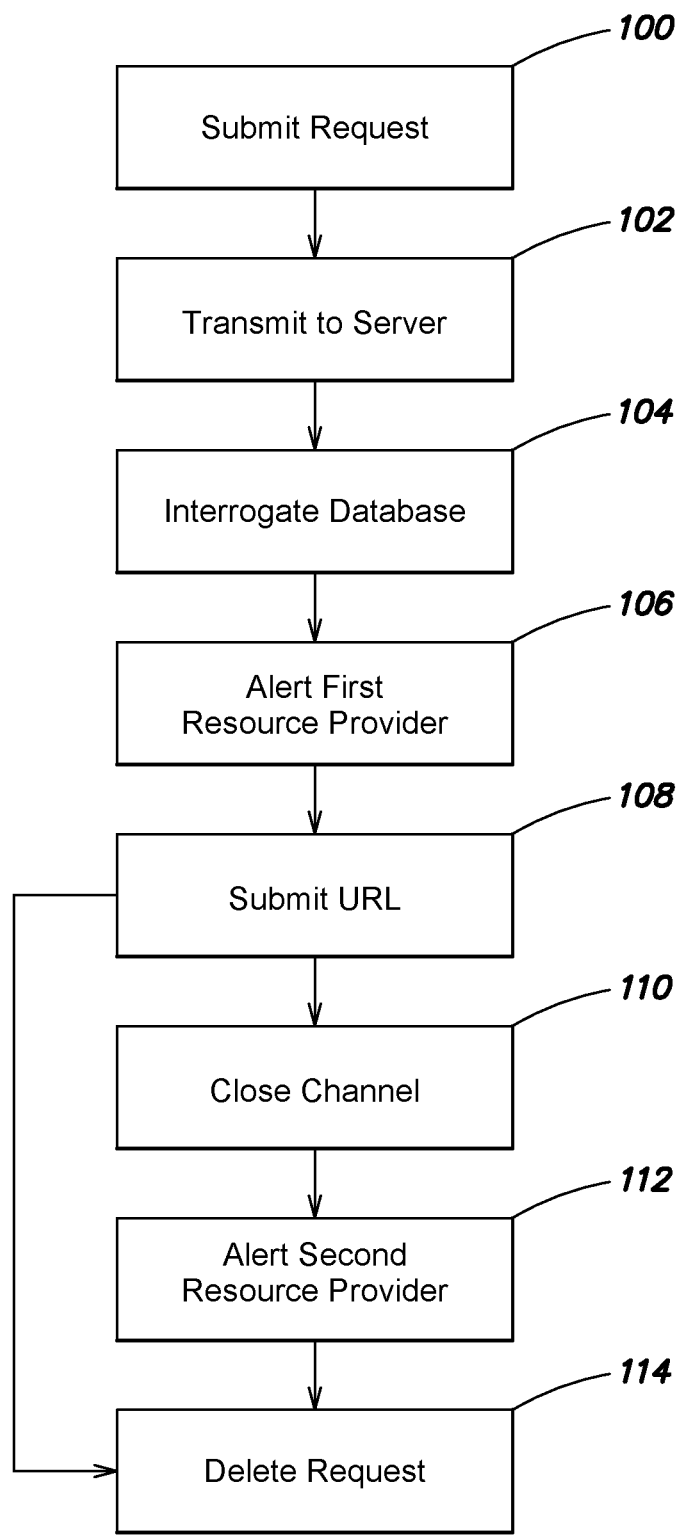
Figure 3:
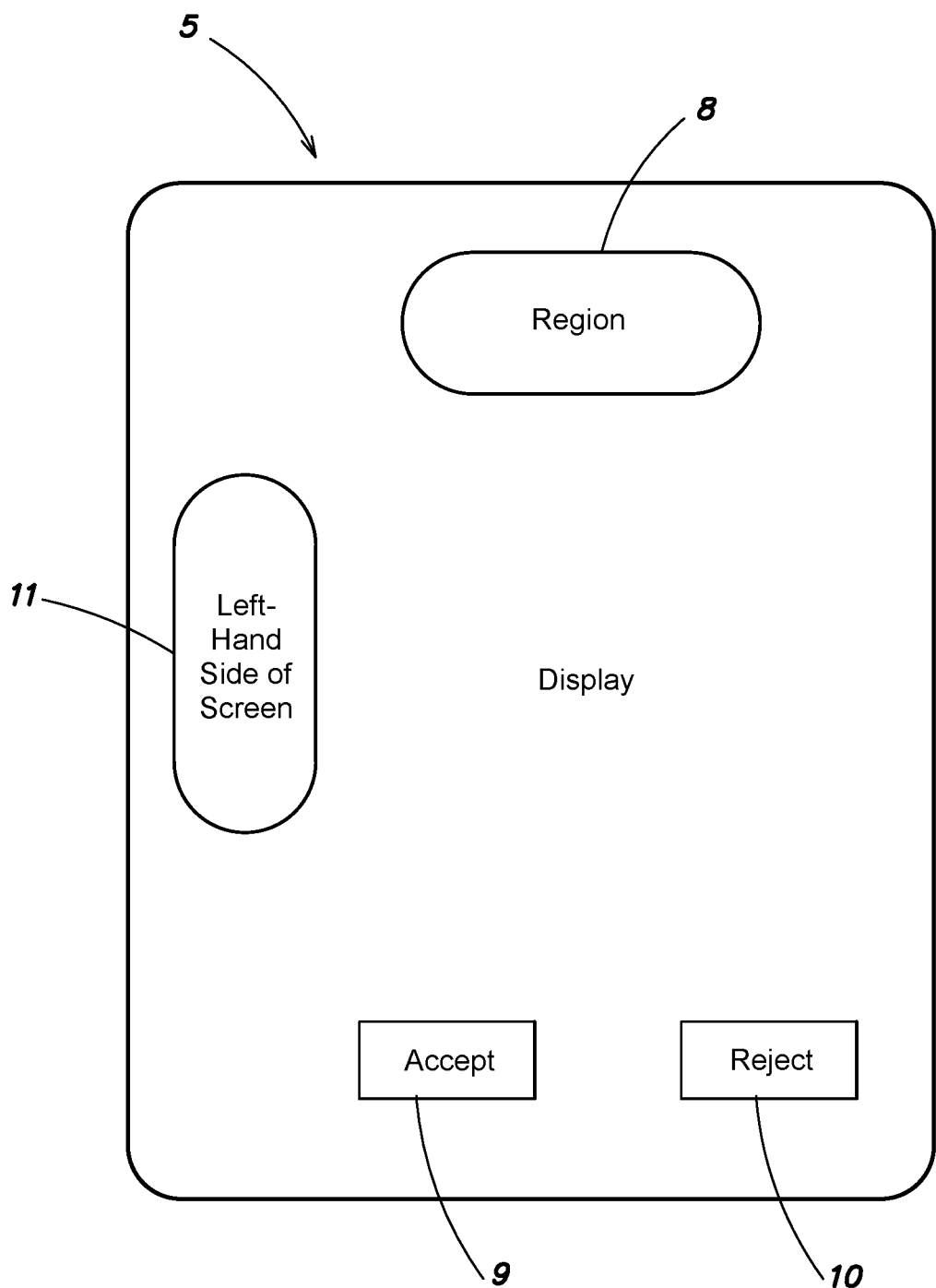

The present invention will now be described by way of example only, and with reference to the accompanying drawings, in which:

FIG. 1 is a schematic diagram illustrating a system for providing an internet-based search engine in accordance with an embodiment of the present invention;

FIG. 2 is a flow chart illustrating the method of providing an Internet-based search mechanism to enable an anonymous user to search for a resource in accordance with an embodiment of the present invention; and FIG. 3 is a schematic screen shot illustrating user options on a mobile device hosting die internet-based portal utilised in an Internet-based search mechanism in accordance with an embodiment of the present invention.

The present invention takes a different approach to existing internet-based search engines, by using an asynchronous methodology rather than a synchronous methodology to provide search results relating to resources. In the following description, a resource refers to goods and/or services required by a user, a resource provider to an entity able to provide the requested resource, and information relating directly to a resource to details of a resource and not an indication of content of a webpage. A URL containing information relating directly to a resource links or otherwise provides relevant content that is displayable to a user. Hence relevant content is content that relates directly to the requested resource, and a URL containing appropriate information is one that contains information relating directly to a resource. An asynchronous methodology is one where results are provided sequentially, one at a time, rather than a plurality of results being provided simultaneously as with a synchronous methodology. An asynchronous methodology can be described in the context of the present invention as follows. A user submits an anonymous request for information relating to a resource required by the user to a database of resource provider information via an internet-based portal. The database is then interrogated to retrieve information relating to first resource provider information associated with the resource, and the first resource provider is alerted that the anonymous request for information has been submitted. An anonymous internet-based communication channel is initiated between the user and the first resource provider via the internet-based portal by the first resource provider submitting a first Universal Resource Locator (URL) to the user in response to the anonymous request for information. If the first Universal Resource Locator does not contain information relating directly to the resource requested by the user, the anonymous internee-based communication channel is closed and the first resource provider is prevented from communicating further with the user via the internet-based portal. In this situation, a second resource provider is alerted that the anonymous request for information has been submitted.

If the first Universal Resource Locator does contain information relating directly to the resource requested by the user, the anonymous request for information is deleted from the internet-based portal. Results are delivered sequentially to an anonymous user, and should the result not reflect the request resource accurately, the communication channel is closed. This is described in more detail below.

To enable such a method, a system for providing an internet-based search mechanism to enable an anonymous user to search for a resource provider is provided. A user device is adapted to host an internet-based portal. This enables a user to submit an anonymous request for information relating directly to a resource. A secure server is adapted to host a database containing resource provider information, to communicate with the user device via a communications network and to alert at least a first resource provider. The secure server is also adapted to initiate an anonymous communication channel between at least the first resource provider and the user via the internet-based portal and the communications network. This is also discussed in more detail below.

FIG. 1 is a schematic diagram illustrating a system for providing an internet-based search engine in accordance with an embodiment of the present invention. A secure server 1 is located remote from an anonymous user 2, who is able to access the secure server 1 via a device 3 that is capable of supporting a software program and user interface giving access to an internet-based portal, the internee-based portal taking the form of an application that the user 2 can use to access data transmitted to and received from the secure server 1. The user 2 is anonymous since their identity details do not form part of the data transmitted between the device 3 and the secure server 1. The device 3 connects to the secure server 1 via a communications network 4, such that data can be transmitted and received by both the secure server 1 and the device 3 over the communications network 4, with the user 2 using the internet-based portal supported by the device 3 to input data to be transmitted to the secure server 1 and view data received from the secure server 1 by means of a display 5 on the device 3 that enables the user 2 to interact with the internet-based portal. In particular, the internet-based portal is used by the user 2 to send an anonymous request for information relating directly to a resource to the secure server 1. The device 3 is therefore adapted to host an internet-based portal such that a user can submit this anonymous request, by means of the display 5 and connection with the communications network 4. The user 2 enters information into a dialogue box provided as part of the front end of the internet-based portal, and displayed on the display 5. The search terms form an anonymous request for information, since the identity of the user 2 does not form part of the request and is not notified to any party other than the secure server 1. Hence the identity of the user 2 remains unknown from anyone providing information about the requested resource.

The secure server 1 is also connected via the communications network 4 to a plurality of resource providers 6a, 6b . . . 6n, who are able to provide resources to the user 2. Each resource provider 6a, 6b . . . 6n is remote from both the secure server 1 and the user 2. The secure server 1 is adapted to be able to communicate with the resource providers 6a, 6b . . . 6n, via the communications network 4. In particular, the secure server 1 is provided with means to be able to alert at least a first resource provider 6a, 6b . . . 6n. This alert is to let a resource provider 6a, 6b . . . 6n know that an anonymous request for information has been received from a user 2. However, the identity of the user 2 (name, IP address, email address, phone number or any other identifier) does not form part of this alert, or part of the request for information from the resource provider 6a, 6b . . . 6n, so the user 2 remains anonymous to the resource providers 6a, 6b . . . 6n thought out the process. The secure server 1 hosts a database 7, which comprises information relating to each resource provider 6a, 6b . . . 6n. The information is stored in the form of individual entries, each containing details of the resource provider in question, including, but not limited to, business information, contact details and preference information, as discussed in more detail below. In this embodiment, the secure server 1 does not store any information in the database 7 relating to the user 2. The secure server 1 is also adapted to initiate an anonymous communication channel between at least the first resource provider and the user via the internet-based portal and the communications network 4. This is discussed in more detail in relation to FIG. 2.

FIG. 2 is a flow chart illustrating the method of providing an internet-based search mechanism to enable an anonymous user to search for a resource in accordance with an embodiment of the present invention. At step 100, the user submits an anonymous request for information relating to a resource required by the user to the database 7 of resource provider information via the internet-based portal. This is done by entering a search term or terms, such as "direct, flights Liverpool Southampton", into the dialogue box provided at the front end of the internet-based portal. At step 102, the anonymous request, is transmitted to the secure server 1 via the communications network 4. Once received by the secure server 1 the request can be processed to provide the requested resource information.

At step 104 the database 7 is interrogated to retrieve information relating to first resource provider 6a information associated with the resource. Once the first resource provider 6a information is identified, at step 106 the first resource provider 6a is alerted that the anonymous request for information has been submitted.

At step 108 the first resource provider 6 a submits a first Universal Resource Locator (URL) to the secure server 1. This is then used to initiate an anonymous internet-based communication channel between the user 2 and the first resource provider 6a via the internet-based portal. The URL links to content relating directly to the requested resource, with relevant content being content that relates directly to the requested resource. The secure server 1 facilitates the transfer of the URL to the user 2 to enable the content linked via the URI. to be displayed on the device 3 using the internet-based portal. The URL is submitted in response to the anonymous request for information, and is intended to be a hyperlink to a website or webpage information relating directly to the requested resource. Information relating directly to the resource is information that directly and unambiguously provides details of the requested resource, regardless of whether the resource is goods and/or services, and is not an indication of either webpage or website content (determined, for example, by the number of times a search term appears on a webpage) or sponsored links to resource providers providing similar goods and/or services. However, it is possible that a resource provider 6a, 6b . . . 6n may try to provide content-based results or other inappropriate information as with traditional synchronous internet search engines, and this, as well as the method of dealing with appropriate information is dealt with in steps 110 to 114 below.

In the situation where inappropriate information is provided, that is, the URL does not contain information relating directly to the resource requested by the user 2 and therefore no relevant content can be displayed steps 110 to 112 are followed. At step 110, the anonymous internet-based communication channel is closed, and the first resource provider 6a is prevented from communicating further with the user 2 via the internet-based portal. In this example, the first resource provider 6a submits a URL that contains information regarding indirect flights from Liverpool to Southampton and direct flights from Manchester to Southampton. This information therefore does not relate directly to the requested resource. The content displayed will therefore not match the resource requested by the user 2. Since the first resource provider 6a is now removed from the search process by the closure of the anonymous communication channel, at step 112 the secure server 1 alerts a second resource provider 6b that the anonymous request for information has been submitted. The second resource provider 6b is then able to submit a URL in the same manner as the first resource provider 6a in step 108 above. Again, if the URL provided by the second resource provider 6b does not contain information directly related to the resource, such that the content displayed does not match the resource requested by the user 2, the anonymous communication channel is closed and the third resource provider 6c alerted, and so on, until the nth resource provider 6n is able to satisfy the search request by providing a URL containing information relating directly to the requested resource.

At step 114, if the first URL does contain information relating directly to the resource requested by the user 2, the anonymous request for information from the internet-based portal is deleted. At this point the search request is satisfied and there is no need to keep any user or search information within the internet-based portal. In this example the first resource provider 6a provides a URL that links to information indicating that there are no direct flights available. If the second resource provider 6b has been alerted, step 114 is carried out if the URL submitted by this second resource provider 6b contains information relating directly to the resource, such that the search request is satisfied. If the second resource provider 6b does not submit a URL containing information relating directly to the resource, steps 110 and 112 are repeated until the nth resource provider 6n is able to satisfy the search request. If no resource provider 6a, 6b . . . 6n is able to satisfy the search request, the search request remains logged in the internet-based portal and/or at the secure server 1, until it is either deleted by the user 2 or the secure server 1. This may be based upon a time before expiry of the search request or as the result of a specific deletion of the search request.

FIG. 3 is a schematic screen shot illustrating user options on a mobile device hosting the internet-based portal utilised in an internet-based search mechanism in accordance with an embodiment of the present invention. The screen shot illustrates the features shown on the display 5 to a user 2 during use of an embodiment of the present invention, forming a user interface. The software application displays resource provider information in the format of an internet browser, and wherein the internet browser has a region 8 for displaying the content linked and therefore available via the URL, an "Accept" button 9 and a "Reject" button 10. These buttons are in the form of icons displayed as part of the user interface. A list of previous searches is available, displayed in a region provided on the left-hand side of the screen 11. These are searches that have not yet been deleted since either so far no information relating directly to the resource requested has been provided, or the user wishes to keep the same search within the software for future responses. The software provides the ability for the user 2 to input search terms relating to the required resource, using a keypad, keyboard, touch screen, verbal commands or the like. The role of these is explained further below. In addition, the internet-based portal is capable of displaying the content linked via received URIL at the same time as at least the Accept 9 and Reject 10 buttons, the role of which is explained in more detail below. Any searches saved for future use are not visible to or available to the resource providers 6a, 6b . . . 6n, but merely visible to the secure server 1. The secure server 1 polls resource providers 6a, 6b . . . 6n on the basis of any stored searches to check whether a resource provider 6a, 6b . . . 6n able to provide the resource information can be identified, but once the search has been deleted by the user 2 this is no longer possible.

In the example described above, the anonymous communication channel is closed automatically by the secure server 1 if the URL does not contain appropriate information relating directly to the requested resource. However, it is preferable that user 2 closes the anonymous communication channel. This is the purpose of the Accept 9 and Reject 10 buttons, since this is how the internet-based portal displays the option for the user to accept or reject the URL. If, as described above when the URIL does not contain information relating directly to the resource requested by the user 2, then in this example when the user 2 rejects the URL, the anonymous communication channel is closed to the resource provider 6a, 6b . . . 6n. The user 2 rejects the URL on the basis that the content displayed is not relevant to the resource requested, that is, that the URL does not contain information relating directly to the resource.

A further advantage of the present invention is the ability to assign an order of preference to data stored in the database 7. This may be used to order the resource provider information stored in the database 7 such that this may be used to alert resource providers 6a, 6b . . . 6n in an order determined by the system. This may be considered a method of ranking the resource provider information. Although many criteria could be used to provide such preferential data storage, in the present invention the preferred method is to use the number of times URLs from a particular resource provider 6a, 6b . . . 6n are accepted or rejected. For example, if the first URL does not contain information relating directly to the resource requested by the user, a negative indicator is assigned. If the first URL does contain information relating directly to the resource requested by the user, a positive indicator is assigned. Where the user 2 is able to accept or reject the URL, if the user 2 rejects the URL, a negative indicator is assigned, and if the user 2 accepts the URL, a positive indicator is assigned. The resource provider information is then stored in the database ranked in order of the number of positive and negative indicators assigned to each resource provider 6q, 6b . . . 6n. In addition, if the first URL does contain information relating directly to the resource requested by the user 2, the anonymous information request will be stored in the database 7 and resource providers 6a, 6b . . . 6n are polled until a resource provider 6a, 6b . . . 6n able to provide the resource information is identified. Consequently, the information in the database 7 may be ordered by the number of times a resource provider 6a, 6b . . . 6n has provided a URL containing the requested resource, such that the first 6a and second 6b resource providers above are ranked, and wherein the first resource provider 6a is ranked higher than the second resource provider 6b. In effect the secure server 1 alerts the "best" (highest ranked) resource provider 6a, 6b . . . 6n first.

In the above examples, the user 2 remains anonymous to the resource providers 6a, 6b . . . 6n. This is due to the secure server 1 initiating the anonymous communication channel, since no identity data relating to the user 2 is transferred to the resource providers 6a, 6b . . . 6n, and once the search is completed all information regarding the anonymous request for information is deleted from the internet-based portal. Since the user 2 receives information via the secure server 1, the IP address of the user 2 is also invisible to the resource providers 6a, 6b . . . 6n, who merely provide information to the secure server 1. The security of the system may be improved yet further by the use of a walled-garden approach, that is, the secure server 1 is only accessible to registered and authorised resource providers 6a, 6b . . . 6n. In this situation, the database 7 only contains resource provider information for authorised resource providers 6a, 6b . . . 6n. Only authorised resource providers 6a, 6b . . . 6n will be alerted by the secure server 1 at the point an anonymous request for information is submitted by a user 2. The database 7 is interrogated using an algorithm that utilises probability weightings to prevent low performance resource providers 6a, 6b . . . 6n (those with a number of negative indicators) being completely excluded from responding to requests, and ensures that newly registered resource providers 6a, 6b . . . 6n are not automatically deferred to more established resource providers 6a, 6b . . . 6n. Aside from the secure server 1 being able to poll resource providers 6a, 6b . . . 6n, resource providers 6a, 6b . . . 6n may communicate details of resources to the secure server 1 during registration or at other times.

As can be seen from the example above, the system operates as an asynchronous search engine. This results in the content linked via URLs being displayed to the user one at a time.

Other modifications to the above embodiments will be apparent to those skilled in the art.

The invention claimed is:

1. A method of providing an internet-based search mechanism to enable an anonymous user to search for a resource provider, comprising the steps of:
submitting an anonymous request for information relating to a resource required by a user to a database of resource provider information via an internet-based portal;

interrogating the database to retrieve information relating to first resource provider information associated with the resource and with a first resource provider, and alerting the first resource provider that the anonymous request for information has been submitted;

initiating an anonymous internet-based communication channel between the user and the first resource provider via the internet-based portal by the first resource provider submitting a first Universal Resource Locator (URL) to the user in response to the anonymous request for information;

if the first Universal Resource Locator does not contain information relating directly to the resource requested by the user, closing the anonymous internet-based communication channel and preventing the first resource provider from communicating further with the user via the internet-based portal, and alerting a second resource provider that the anonymous request for information has been submitted;

if the first Universal Resource Locator does contain information relating directly to the resource requested by the user, deleting the anonymous request for information from the internet-based portal, and wherein the database is a component of an asynchronous search engine.

2. The method of claim 1, wherein the user closes the anonymous internet-based communication channel.

3. The method of claim 2, wherein when the user rejects the Universal Resource Locator, the anonymous internet-based communication channel is closed to the first resource provider.

4. The method of claim 3, further comprising the steps of:
if the user rejects the Universal Resource Locator, assigning a negative indicator; and
if user accepts the Universal Resource Locator, assigning a positive indicator.

5. The method of claim 4, wherein the resource provider information is stored in the database ranked in order of the number of positive and negative indicators assigned to each resource provider.

6. The method of claim 1, further comprising when the anonymous internet-based communication channel is initiated, displaying an option for the user to accept or reject the Universal Resource Locator.

7. The method of claim 1, further comprising the steps of:
if the first Universal Resource Locator does not contain information relating directly to the resource requested by the user, assigning a negative indicator; and
if the first Universal Resource Locator does contain information relating directly to the resource requested by the user, assigning a positive indicator.

8. The method of claim 1, wherein the database of the resource provider information only contains information for authorised resource providers.

9. The method of claim 1, wherein the internet-based portal comprises a software application and user interface.

10. The method of claim 9, wherein on receipt of the Universal Resource Locator the software application displays the resource provider information in a format of an internet browser, and wherein the internet browser has a content display region for content linked via the Universal Resource Locator, an accept button, and a reject button.

11. The method of claim 10, wherein content is displayed to the user one Universal Resource Locator at a time.

12. The method of claim 1, wherein if the first Universal Resource Locator does contain information relating directly to the resource requested by the user, the method further comprises the steps of:
storing the anonymous request for information at the database; and
polling resource providers until a resource provider able to provide the resource information is identified.

13. The method of claim 1, wherein the resource comprises at least one of goods and services.

14. The method of claim 1, wherein the information in the database is ordered by the number of times a resource provider has provided a Universal Resource Locator containing the requested resource, such that the first and second resource providers are ranked, and wherein the first resource provider is ranked higher than the second resource provider.

15. A system for providing an internet-based search mechanism to enable an anonymous user to search for a resource provider, comprising:
a user device comprising circuitry configured to host an internet-based portal, the user device being configured to submit an anonymous request for information relating directly to a resource required by a user to a database containing resource provider information via the internet-based portal;
a secure server adapted to host the database containing the resource provider information, the secure server being configured to:
interrogate the database to retrieve information relating to first resource provider information associated with the resource and alerting the first resource provider that the anonymous request for information has been submitted; and
initiate an anonymous internet-based communication channel between the user device and the first resource provider via the internet-based portal by the first resource provider submitting a first Universal Resource Locator (URL) to the user device in response to the anonymous request for information,
wherein if the first URL does not contain information relating directly to the resource requested by the user, at least one of the user device and the secure server is further configured to close the anonymous internet-based communication channel and prevent the first resource provider from communicating further with the user via the internet-based portal, and alert a second resource provider that the anonymous request for information has been submitted,
wherein if the first URL does contain information relating directly to the resource requested by the user, at least one of the user device and the secure server is further configured to delete the anonymous request for information from the internet based portal, and
wherein the database is a component of an asynchronous search engine.

* * * * *